(12) United States Patent
Blackmore et al.

(10) Patent No.: US 7,052,567 B1
(45) Date of Patent: May 30, 2006

(54) INFLATABLE HEATING DEVICE FOR IN-SITU REPAIR OF CONDUIT AND METHOD FOR REPAIRING CONDUIT

(75) Inventors: Richard D. Blackmore, Houston, TX (US); William M. Lepola, Magnolia, TX (US)

(73) Assignee: Verline Inc., Houston, TX (US)

( * ) Notice: Subject to any disclaimer, the term of this patent is extended or adjusted under 35 U.S.C. 154(b) by 573 days.

(21) Appl. No.: 09/588,407

(22) Filed: Jun. 6, 2000

Related U.S. Application Data

(63) Continuation-in-part of application No. 08/882,769, filed on Jun. 26, 1997, now abandoned, which is a continuation-in-part of application No. 08/431,302, filed on Apr. 28, 1995, now abandoned.

(51) Int. Cl.
*B29C 63/28* (2006.01)
*B29C 73/32* (2006.01)

(52) U.S. Cl. .......................... 156/94; 138/98; 156/294; 156/423; 156/583.3; 219/243; 264/36.17; 264/269; 264/314; 264/404; 425/11; 425/389; 425/392

(58) Field of Classification Search .................. 156/94, 156/156, 287, 294, 423, 583.3; 264/36.17, 264/36.22, 269, 404, 314; 138/97, 98; 219/243; 425/11, 389, 392, 393
See application file for complete search history.

(56) References Cited

U.S. PATENT DOCUMENTS 1,362,351 A  * 12/1920 Rankin
1,923,736 A  *  8/1933 Lewis et al.
1,960,120 A      5/1934 Mohring (Continued)

FOREIGN PATENT DOCUMENTS

DE         3525333    *   1/1987

(Continued)

OTHER PUBLICATIONS

Machine translation for Japan 6-109194.*

(Continued)

*Primary Examiner*—Steven D. Maki
(74) *Attorney, Agent, or Firm*—David McEwing

(57) ABSTRACT

The apparatus of the present invention is generally characterized by a heating/inflation module having pressurizable interior and an attached heat curable pre-preg. In particular, an elastomeric, seamless composite is provided that includes a heating element disposed within a thermoset resin matrix. The composite adapted to maintain a consistent temperature profile and an internal air pressure. A first end piece is attached to a first end of the composite and has an air port for communication with a compressed air source, a vacuum port for communication with a vacuum supply source and at least one electrical cable port for communication with a power supply source. A second end piece attached to a second end of the composite. The apparatus further includes a pre-preg removably attached to an outer surface of the composite. The pre-preg includes a structural fiber matrix supporting a heat curable resin. The composite is constructed by applying a liquid silicone matrix to at least one layer of braided or wound and/or tape fibers, wherein a portion of the fibers are electrically conductive. The layer of braided fibers is introduced into a mold, and a removable, expandable inner bladder is then loaded into the mold. The inner bladder is inflated to conform the layer of braided fibers to an interior surface of the mold. An electric current is caused to flow to the conductive fibers to cure the silicone matrix into a stable, elastomeric state. The composite is removed from the mold. A method for repairing a damaged section of a conduit is also disclosed.

9 Claims, 10 Drawing Sheets

U.S. PATENT DOCUMENTS

| | | | |
|---|---|---|---|
| 2,458,864 A | | 1/1949 | Lindsay |
| 2,822,576 A | * | 2/1958 | Rowe |
| 3,346,442 A | | 10/1967 | Carmody |
| 3,390,951 A | | 7/1968 | Finger et al. |
| 3,414,449 A | * | 12/1968 | Beach |
| 3,962,394 A | | 6/1976 | Hall |
| 4,191,383 A | | 3/1980 | Baker et al. |
| 4,385,957 A | | 5/1983 | Wackerle et al. |
| 4,510,219 A | | 4/1985 | Rowlette |
| 4,560,428 A | | 12/1985 | Sherrick et al. |
| 4,568,592 A | | 2/1986 | Kawaguchi et al. |
| 4,609,449 A | | 9/1986 | Morin |
| 4,624,751 A | | 11/1986 | Morin et al. |
| 4,661,403 A | | 4/1987 | Morin |
| 4,668,545 A | | 5/1987 | Lowe |
| 4,708,527 A | | 11/1987 | Inhofe, Jr. et al. |
| 4,778,553 A | | 10/1988 | Wood |
| 4,792,374 A | | 12/1988 | Rianda |
| 4,838,971 A | | 6/1989 | Cacak |
| 4,861,634 A | | 8/1989 | Renaud |
| 4,874,454 A | | 10/1989 | Talalay et al. |
| 4,874,548 A | | 10/1989 | Hajovsky |
| 4,902,215 A | | 2/1990 | Seemann, III |
| 4,904,351 A | | 2/1990 | Morin |
| 4,909,910 A | | 3/1990 | Morin |
| 4,929,669 A | | 5/1990 | Jensen |
| 4,966,729 A | | 10/1990 | Carmona et al. |
| 4,972,880 A | | 11/1990 | Strand |
| 4,976,828 A | | 12/1990 | Morin |
| 4,980,008 A | | 12/1990 | Woods et al. |
| 4,994,518 A | | 2/1991 | Morin et al. |
| 4,995,761 A | | 2/1991 | Barton |
| 4,997,511 A | | 3/1991 | Newsom |
| 5,010,440 A | | 4/1991 | Endo |
| 5,027,575 A | | 7/1991 | Owen |
| 5,043,033 A | | 8/1991 | Fyfe |
| 5,052,906 A | | 10/1991 | Seemann |
| 5,062,781 A | * | 11/1991 | Szyms et al. |
| H1088 H | | 8/1992 | Marks |
| 5,147,714 A | | 9/1992 | Ellison et al. |
| 5,182,134 A | | 1/1993 | Sato |
| 5,199,463 A | | 4/1993 | Lippiatt |
| 5,216,085 A | * | 6/1993 | Guenthner et al. |
| 5,248,864 A | | 9/1993 | Kodokian |
| 5,259,901 A | * | 11/1993 | Davis et al. |
| 5,266,137 A | | 11/1993 | Hollingsworth |
| 5,286,417 A | | 2/1994 | Mahmoud et al. |
| 5,316,462 A | | 5/1994 | Seemann |
| 5,326,410 A | | 7/1994 | Boyles |
| 5,326,636 A | | 7/1994 | Durand et al. |
| 5,451,351 A | | 9/1995 | Blackmore |
| 5,606,997 A | | 3/1997 | Blackmore et al. |
| 5,628,345 A | | 5/1997 | Fisco |
| 5,706,861 A | | 1/1998 | Wood et al. |

FOREIGN PATENT DOCUMENTS

| | | | |
|---|---|---|---|
| EP | A 0 173 446 | | 3/1986 |
| EP | A 0 378 232 | | 7/1990 |
| EP | 432761 | * | 6/1991 |
| GB | 945911 | | 1/1964 |
| JP | 61-18920 | | 9/1977 |
| JP | 56-67217 | | 11/1979 |
| JP | 2-150334 | | 6/1990 |
| JP | 2-158323 | | 6/1990 |
| JP | A 3-212568 | | 9/1991 |
| JP | 6-88027 | | 3/1994 |
| JP | 6-234161 | * | 8/1994 |
| WO | WO 85/03906 | | 9/1985 |
| WO | WO 93/06410 | | 4/1993 |

OTHER PUBLICATIONS

Machine translation for Japan 6-234161.*
Translation for Japan 2-158323.*
*"Electrically Conductive Non-Metallic Textile Coatings" by R.V. Gregory, W.C. Kimbrell and H.H. Kuhn, reprinted from Journal Of Coated Fabrics, vol. 20—Jan. 1991.
*"Update on Electrically Conductive Polymers and Their Applications" by K.F. Schoch, Jr., IEEE Electrical Insulation Magazine May/Jun. 1994—vol. 10, No. 3, pp. 29-32.
*"Trickle Impregnating with Polyester Resin to Maximize the Quality of Wound Components in High Volume Production Lines" by Len Goodyer, IEEE Electrical Insulation Magazine Jul./Aug. 1994—vol. 10, No. 4, pp. 6-9.
*The Scrimp™ Systems advertising brochure.
*"Processing of carbon fiber reinforced plastic by means of Joule heating" by Hiroshi Fukuda, (Dep. Materials Science and Technology, Science Univ. Tokyo, Noda, Japan 278).
*Search Report mailed Apr. 1, 1996 in International Application No. PCT/US95/10356.

* cited by examiner

INFLATABLE HEATING DEVICE FOR IN-SITU REPAIR OF CONDUIT AND METHOD FOR REPAIRING CONDUIT

RELATED U.S. PATENT APPLICATION

This is a continuation-in-part of application Ser. No. 08/882,769, filed Jun. 26, 1997 now abandoned, which is a continuation-in-part of application Ser. No. 08/431,302 filed Apr. 28, 1995 now abandoned.

TECHNICAL FIELD

The present invention generally relates to an inflatable heating device and method of forming the device. More particularly, the invention relates to an inflatable heating device which can be inflated by a pressurized fluid and heated via an electrically conductive, non-ferrous matrix within the device's composition. The device can be used to provide compaction and heat sufficient to influence a physical reaction in a material in contact with the device's exterior, such as heating, compressing and curing a hardenable resin used in the in-situ repair of damaged conduits such as underground sewer pipes, and other structures having tubular or other three dimensional curvature.

BACKGROUND OF THE INVENTION

Use of composite materials in the repair of both accessible and inaccessible piping systems is becoming increasingly popular. The costs associated with replacing new conduits may be avoided or at least delayed by carrying out maintenance procedures at the damaged section of an on site or in-situ conduit. Generally, such maintenance procedures entail locating the damaged section and installing a thin, durable material to cover the defects, thus restoring the integrity of the conduit.

The materials and procedures employed in in-situ repair technology have been quite varied. Both low-cost, low-quality and high-cost, high-quality composites have been developed. Most composites are designed as highly flexible materials in order to facilitate their transport to the damaged vicinity of the conduit. After transport, means are employed to conform the composite to the internal geometry of the damaged section. A reinforced lining impregnated with a resin covering the damaged section is then permanently cured to form a protective shell. The lining may be impregnated with resin on site or pre-impregnated at a remote location. The curing is accomplished either by ambient conditions or by positive heat-activation methods, such as hot water, steam, or electrical resistance heating. Ambient curing is inferior, however, because ambient conditions may vary widely and disrupt the curing cycle.

In the past, flexible heaters have been produced using ferrous or metallic wires within the composition to provide heat by resistive means. While these wires are an efficient heating element, the flexibility of the heater is limited by the use of such wires. For instance, in Japan 2158323 copper wires are used as the heating elements. With the repeated inflating and deflating that would be experienced with repeated use, it is expected that the redundant load paths associated with the flexing will cause the copper wires to fail, thus losing electrical continuity and heating capability. This severally limits the life cycle of a flexible heater manufactured with metallic wires. Copper wires disposed in a flexible composition also exhibit very poor adhesion to the surrounding polymer (usually silicon) making uniform and consistent positioning of the wires within the polymer matrix, throughout the expected life cycle of the heater, difficult if not impossible. This can result in the resistance wires being redistributed within the heater in undesired arrangements. While various primers can be employed to increase the bond strength between the polymer matrix and the wires, such primers can further degrade the flexible strength of the wire and limit its malleability, causing premature failure. Additionally, as copper or metallic wires are heated (resistively), their electrical resistance increases proportionately to the temperature increase. In a flexible heater, this means that the amount of power required to achieve a desired temperature must be increased throughout the heating cycle. The relatively high mass of copper or other electrically conductive metal, also results in a lag in response time when used as a heating element, thus requiring constant monitoring and adjustment of the power supply.

Inflatable bladders that incorporate various heating means have also been used for curing materials impregnated with a thermosetting resin matrix, such as polyester or epoxy based resins. In these resin types, certain chemicals are present that have a detrimental effect on silicone products. Specifically, silicones, when exposed to certain chemicals such as styrene, which is present in many resin systems, and heat, will revert after a limited number of uses to into a weak form no longer suitable as an inflation device.

Historically, the actual production of flexible, inflatable heaters has been accomplished by various means. In one method, uncured strips of resin impregnated sheets of resilient, flexible material are laid on a mandrel or forming surface. The strips are then exposed to a heat source capable of providing sufficient heat to cure the uncured strips. Ovens have been used to accomplish this curing procedure. However, the ovens required are expensive and generally inefficient, as they must heat a large volume of air as well as the mandrel or forming surface, and the uncured strips. Depending on the mass of the mandrel, a substantial cool down period must also be observed before the heater can be removed from the mandrel. Considerable energy is lost to the atmosphere and cycle times are lengthy in such a procedure. This translates into excessively high manufacturing costs.

In view of the aforementioned shortcomings associated with the conventional methods of construction and use of flexible, inflatable heaters, there is a strong need for a inflatable heating device containing a heating mechanism that is robust. There is also a strong need for materials that can withstand repeated use in aggressive environments and afford a long life cycle. It will be appreciated that there is also a strong need for an improvement in manufacturing which can reduce production cycle time and capital equipment costs.

The present invention has been developed in response to a need for improved yet affordable composite materials for use as an inflatable flexible heater, as well as for a need for improved in-situ repair procedures.

SUMMARY OF THE INVENTION

An object of one embodiment of the invention is to overcome the problems associated with flexible, inflatable heaters which incorporate metallic heating elements, and to provide a robust, inflatable heating device with an extended life cycle. Another object is to provide an inflatable heating device and process for manufacturing such devices which can reduce the cycle time in production and reduce the capital equipment costs associated with the production.

The apparatus of the present invention is generally characterized by a heating/inflation module having pressurizable interior and an attached heat curable pre-preg. In particular, an elastomeric, seamless composite is provided that includes a heating element disposed within a thermoset resin matrix. The composite is adapted to maintain a consistent temperature profile and an internal air pressure. A first end piece is attached to a first end of the composite and has an air port for communication with a compressed air source, a vacuum port for communication with a vacuum supply source and at least one electrical cable port for communication with a power supply source. A second end piece attached to a second end of the composite. The apparatus further includes a pre-preg removably attached to an outer surface of the composite. The pre-preg includes a structural fiber matrix supporting a heat curable resin.

The composite is constructed by applying a liquid silicone matrix to at least one layer of braided fibers, wherein a portion of the fibers are electrically conductive. The layer of braided fibers is introduced into a mold, and a removable, expandable inner bladder is then loaded into the mold. The inner bladder is inflated to conform the layer of braided fibers to an interior surface of the mold. An electric current is caused to flow to the conductive fibers to cure the silicone matrix into a stable, elastomeric state. The finished composite is then removed from the mold.

A method for repairing a damaged section of a conduit is also disclosed. A pre-preg is removably attached to an outer surface of an elastomeric composite. The pre-preg and composite described herein may be used in this procedure. A heater/inflation module is produced by providing first and second end pieces respectively attached to first and second ends of the composite. The module with the attached pre-preg is installed into the conduit at a damaged location. The module is then inflated to a predetermined internal air pressure to press the pre-preg against an inside surface of the conduit. The pre-preg resin is cured by causing an electrical current to flow in the heating element of the composite to resistively heat the module to a predetermined temperature. The electrical energy supply and thus the curing cycle may be controlled by conventional means such a programmable logic controller unit. Finally, the module is deflated such as by providing a vacuum source and removed from the conduit, leaving the permanently cured, resin impregnated liner to protect the damaged section of the conduit.

In another embodiment, the invention is an inflatable heating device comprising a generally cylindrical body having an inner surface and an outer surface. The body includes a flexible matrix and a plurality of carbon fibers embedded within the flexible matrix. The carbon fibers are arranged helically and positioned at an angle with respect to the longitudinal axis of the body, wherein the body is capable of expanding and returning to an original form.

The inflatable heating device can be a flexible matrix comprising fluorosilicone and fluorocarbon. The carbon fibers are preferably arranged at an angle of +/−45° with respect to said longitudinal axis of said body and are arranged in tows or bundles to provide approximately 50–90% coverage of said body. The carbon fibers can also be in the form of a non-woven tape.

In another embodiment the invention comprises a process of forming an inflatable heating device comprising the steps of applying a layer of uncured sheets of a fluorosilicone material to a mandrel; winding a plurality of carbon fibers in a helix onto the fluorosilicone material layer; applying a layer of uncured sheets of fluorocarbon material over the carbon fibers; applying a radially inward pressure to said fluorosilicone layer, carbon fibers and fluorocarbon layer; and applying an electric current to said carbon fibers to resistively heat the carbon fibers to cure the fluorosilicone layer and the fluorocarbon layer to form a cured structure. The process further comprises removing said electric current from said carbon fibers; removing the radially inward pressure from the fluorosilicone layer, carbon fibers and fluorocarbon layer; allowing the cured structure to cool; and removing the cured structure from said mandrel. Preferably, the applying an electric current step comprises resistively heating the carbon fibers to heat the fluorosilicone layer and the fluorocarbon layer to a temperature of approximately 300° F. for approximately 45 minutes. Additionally, the process may comprise removing the fluorosilicone layer, carbon fibers and fluorocarbon layer from the mandrel, and heating the fluorosilicone layer, carbon fibers and fluorocarbon layer to a temperature greater than 300° F. The process may also include incorporating a layer of uncured silicon sheets in the cured structure.

Other features and advantages of the invention will be apparent from the following specification taken in conjunction with the following drawings.

DETAILED DESCRIPTION OF THE PREFERRED EMBODIMENT

Figure 1:
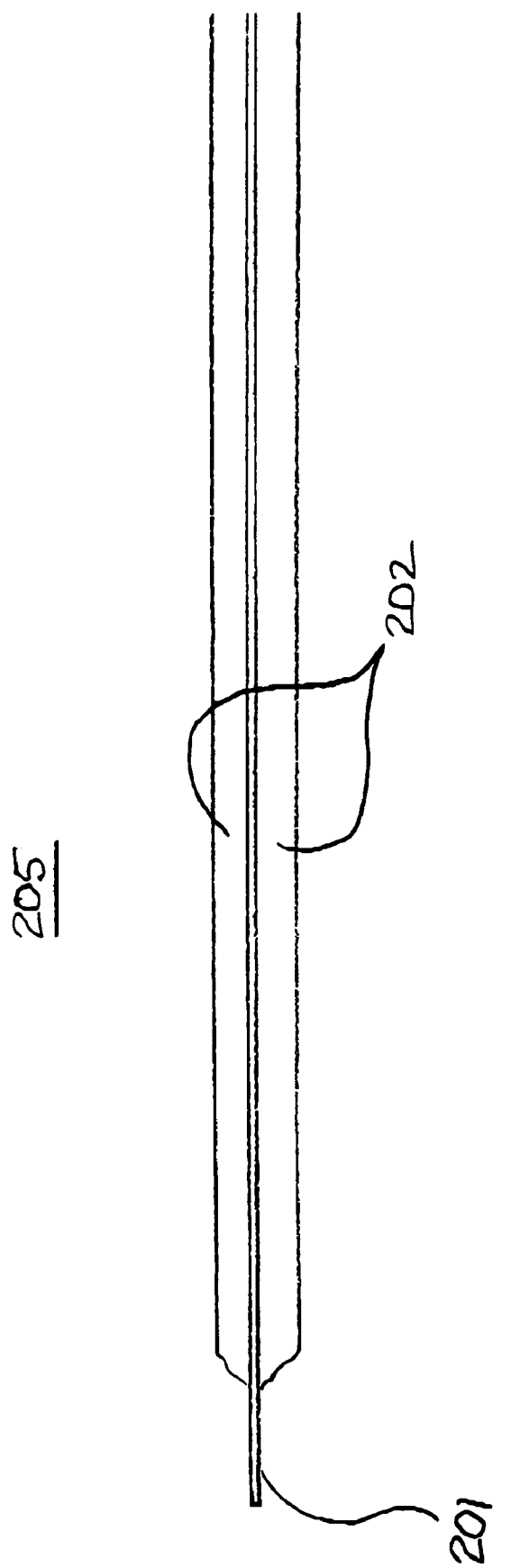
FIG. 1 is a cross-sectional view of the composite of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 cross-sectionally illustrates one embodiment of the composite 205 in accordance with the present invention. The composite 205 is inflatable or elastomeric, seamless, reinforced with structural braids 201, and for most applications generally cylindrical. The composite 205 is a single layer formed from one or more initially discrete layers that are consolidated by means of a thermoset resin 202. The resin 202 is preferably a silicone matrix such as methylvinylpolysiloxane, which will remain flexible after its application and cure. The core of the composite 205 contains a heating element 201 defined by conductive braided fibers. The heating element 201 is used both to cure the actual composite lay-up, and subsequently to cure a separate heat activated resin matrix of the pre-preg as described below.

Figure 2:
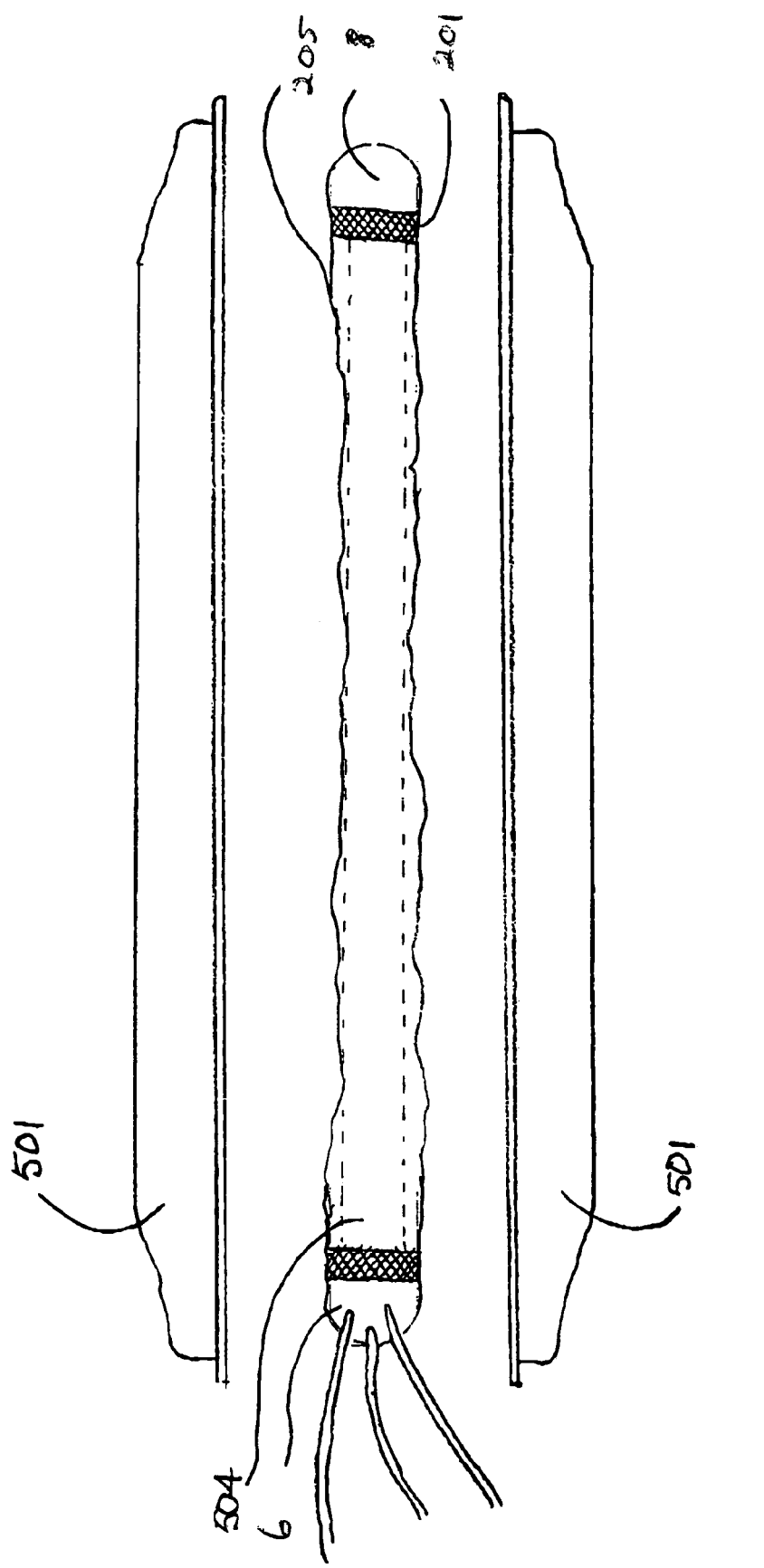
FIG. 2 is a side view of the composite of the present invention installed into a molding apparatus.

With reference to FIG. 2, the silicone matrix 202 used in the construction of the composite 205 is initially a pourable liquid, heat curable methylvinylpolysiloxane or other material having similar properties. The composite 205 is formed by applying the liquid silicone matrix 202 to pre-formed, braided composite fibers shown partially at 201. At least a portion of the fibers 201 should be conductive. Graphite fibers have been found suitable for this purpose. Carbon fibers, being low in mass and with a known conductivity will rapidly produce heat in a uniform manner Because the electrical properties of carbon can be readily assumed, precise and uniform heating can be achieved. The non-ferrous heating element may therefore be of carbon or graphite filaments. For additional structural support, the composite fibers 201 may comprise a combination of graphite and fiberglass braids. The exact ratio of graphite to glass used will depend on the amount of structural strength contemplated as well as the heat generation capability desired. A composite found suitable for the present application consists of biaxial fiberglass braided sleeving with a weight of 10–20 oz/sq. yd. and biaxial carbon braided sleeving with a weight of 15–30 oz./sq. yd. The braid angle of these components is preferably +/−45 degrees. It will be understood that other high-strength, temperature tolerant fiber braids may be substituted for the fiberglass and other electrically conductive fiber braids may likewise be substituted for the graphite. For example, conductive polymer coated nylon or polyester fiber, or a combination of many different conductive fiber braids may be used instead of graphite.

The silicone matrix 202 having been applied and having saturated the heating element layer 201, the composite 205 is then placed in a mold 501 having the desired dimensions and configuration (e.g., cylindrical). The mold 501 shown in FIG. 2 has a typical clam-shell design. An expandable inner bladder or forming mandrel 504 is positioned within the interior space defined by the composite 205, and inflated to conform the composite 205 to the internal shape of the mold 501. Electric current is applied to the conductive braids 201, generating heat sufficient to cause the silicone matrix 202 to irreversibly cure into a flexible or elastomeric state. Front and rear end pieces 6,8 are also permanently molded to the composite 205 during the molding process. Once the matrix 202 has cured, the composite 205 is allowed to cool and is then removed from the mold 501. Note that the inner bladder 504 is only used during the molding process and must be removed from the cured composite 205.

While a single layer of composite material may be cured in this fashion, multiple discrete layers may be used for added thickness and strength. The cured silicone also acts to mechanically consolidate these multiple layers as well as the fiberglass and graphite braids themselves. This process essentially creates a monolithic membrane, preferably having a finished thickness of 60–75 mils, or 0.125 to 0.250 inches. Silicone and fluoropolymer compounds have been preferably selected as the resin material for the composite due to their inherent anti-stick properties. These properties enable the cured pre-preg pipe repair material, described below, to be easily removed from the composite 205 during the in-situ repair process, also described below. The finished composite 205 is strong yet elastomeric and is capable of expanding within a damaged pipe 1 to conform to irregular surfaces therein.

Figure 3:
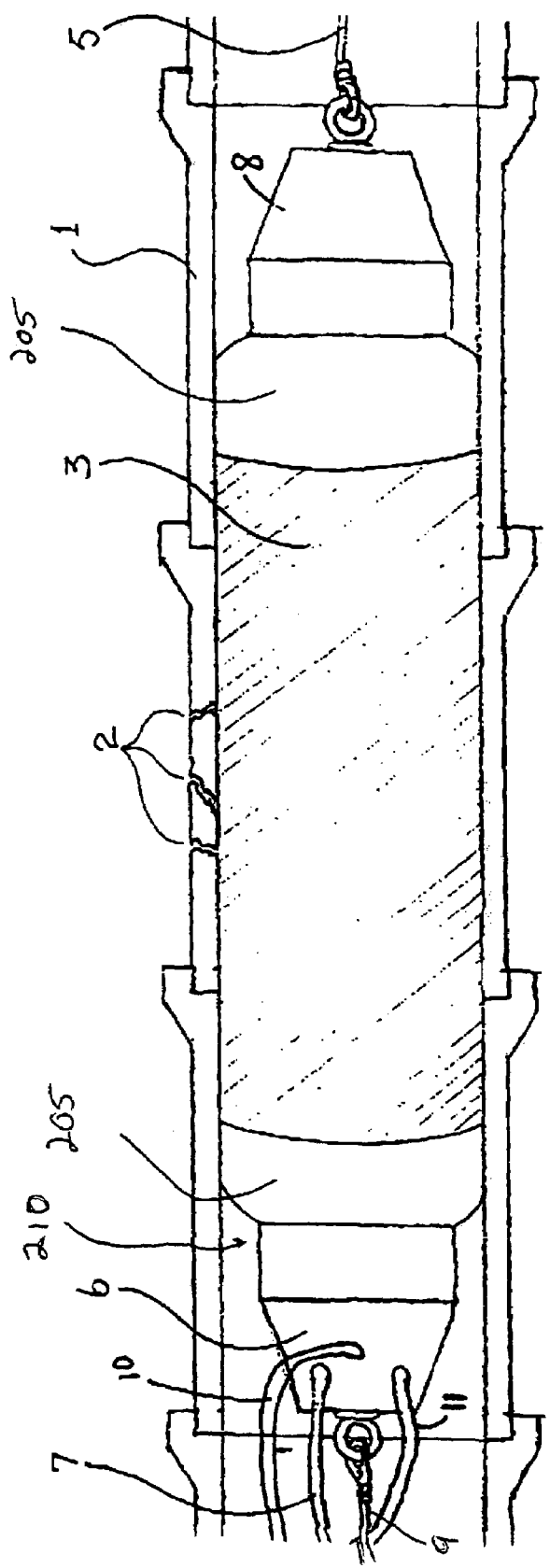
FIG. 3 is a partial cut-away view showing the heating/inflation module of the present invention installed within a conduit to be repaired.
Figure 4:
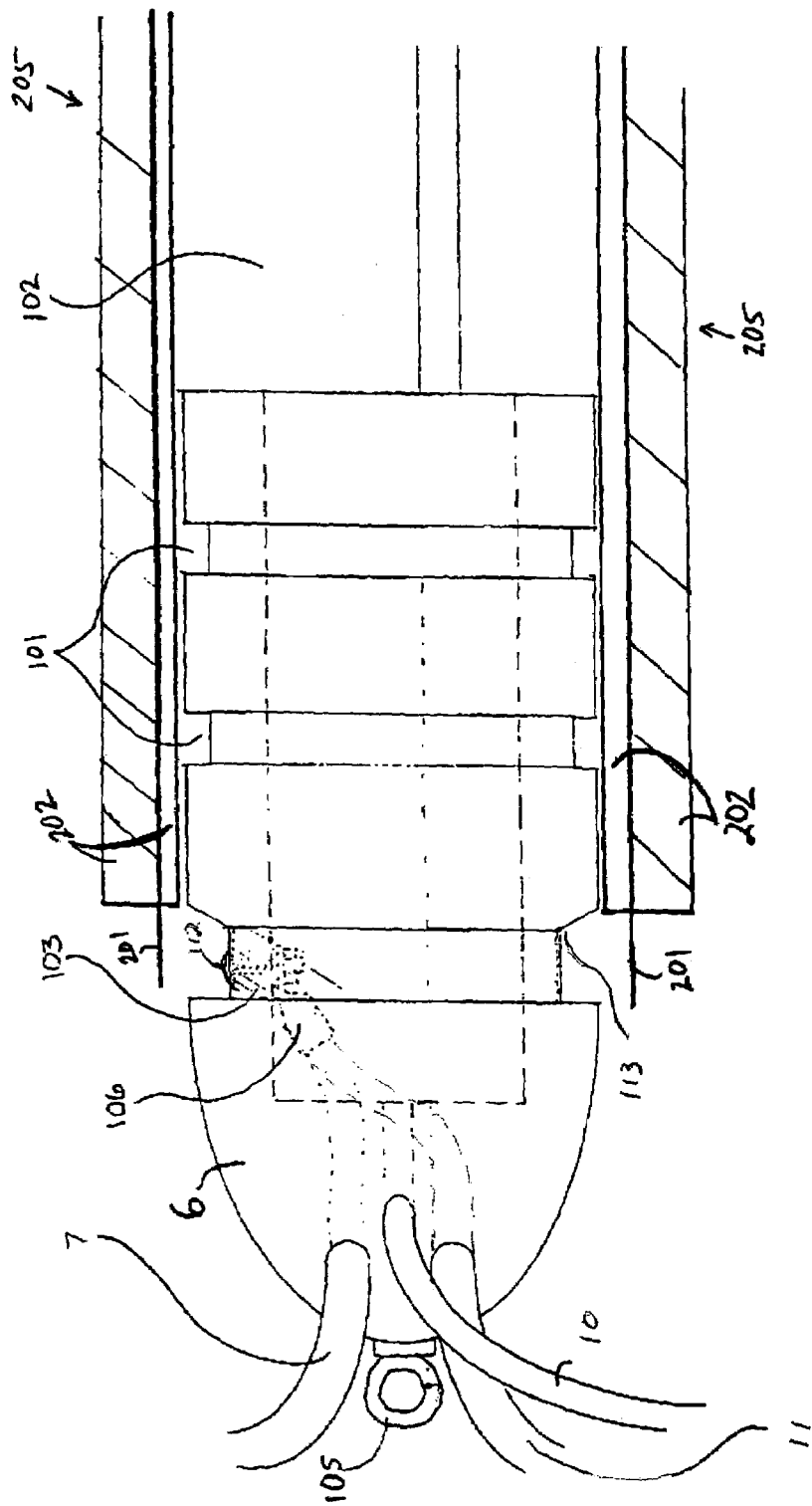
FIG. 4 is a cross-sectional view of the front portion of the heating/inflation module of the present invention.
Figure 5:
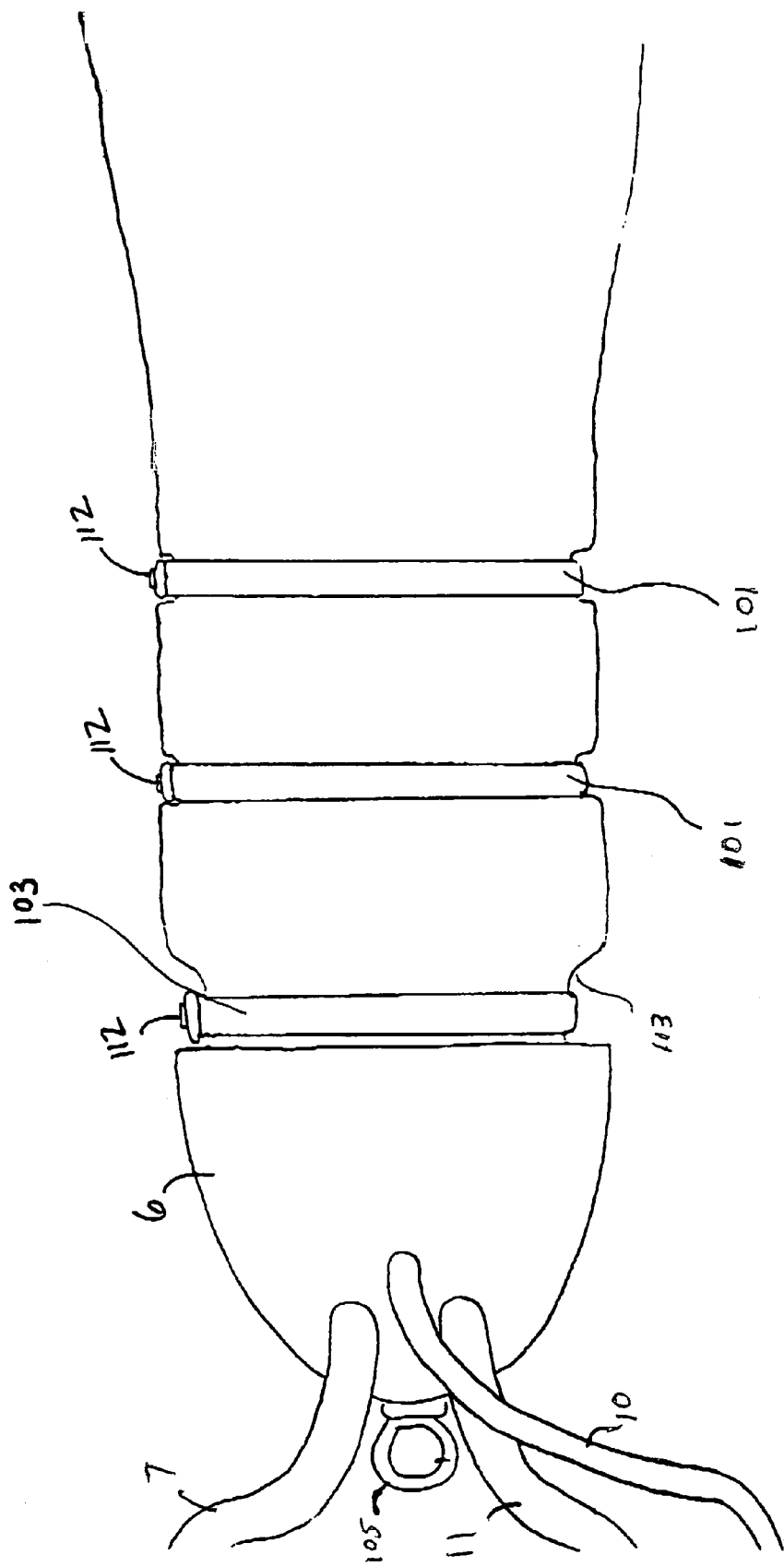
FIG. 5 is a side view of the front portion of the heating/inflation module of the present invention showing the conductive and sealing bands.
Figure 6:
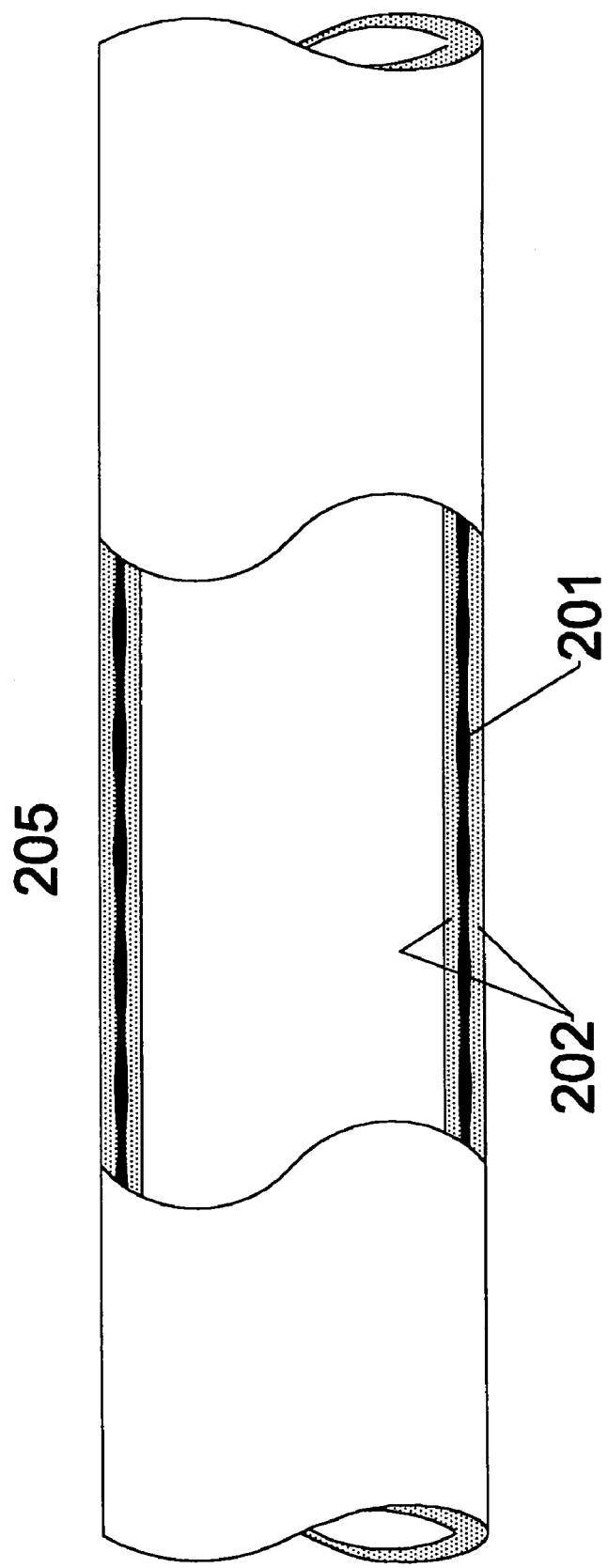
FIG. 6 is a perspective view of the inflatable heater device of the present invention with a cut-out portion.
Figure 7:
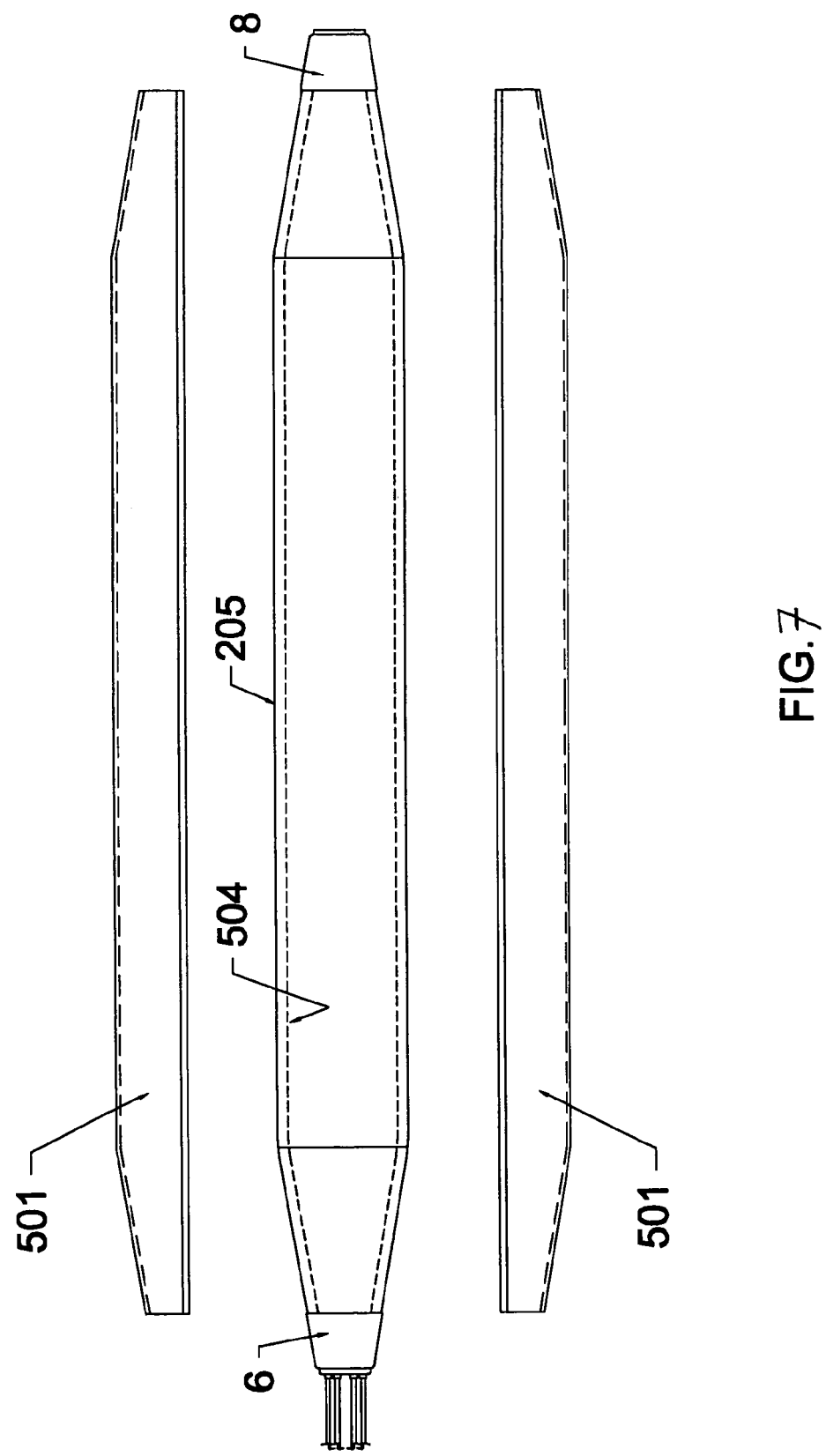
FIG. 7 is a side view of the inflatable heater device of the present invention installed into a molding apparatus.
Figure 8:
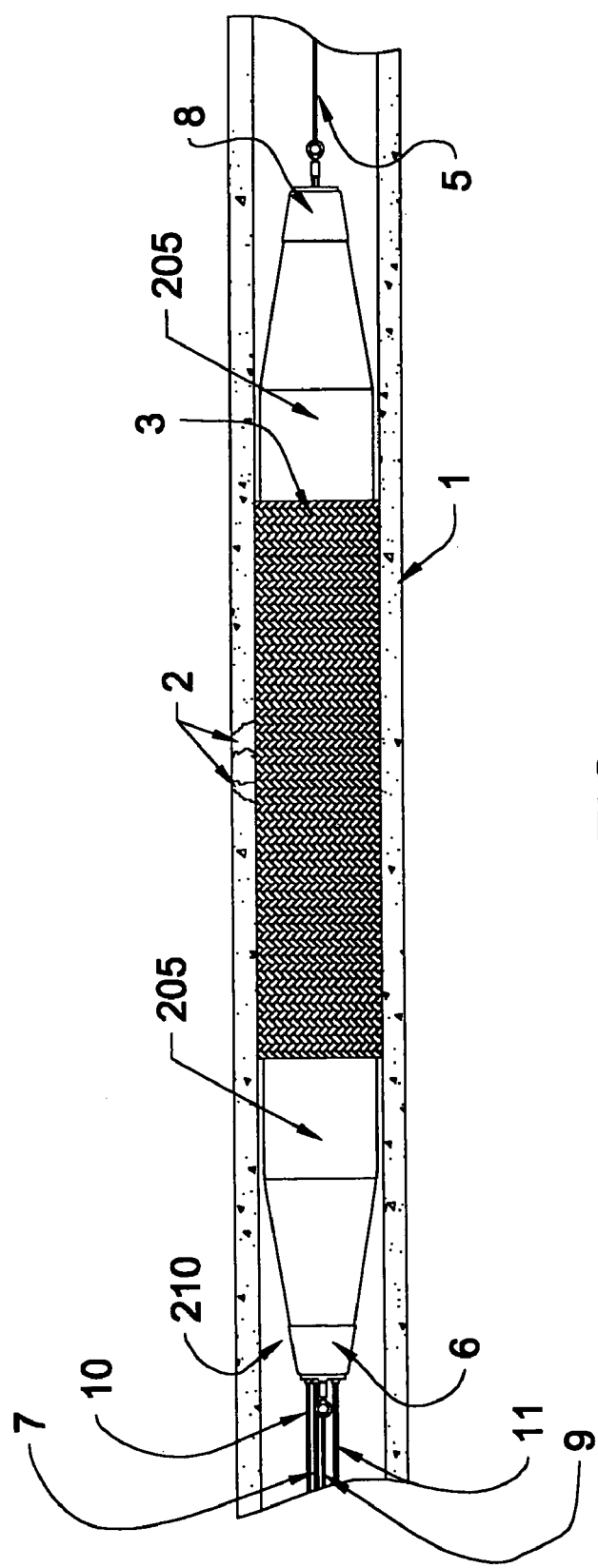
FIG. 8 is a partial cut-away view showing the inflatable heating device or module of the present invention installed within a conduit to be repaired.
Figure 9:
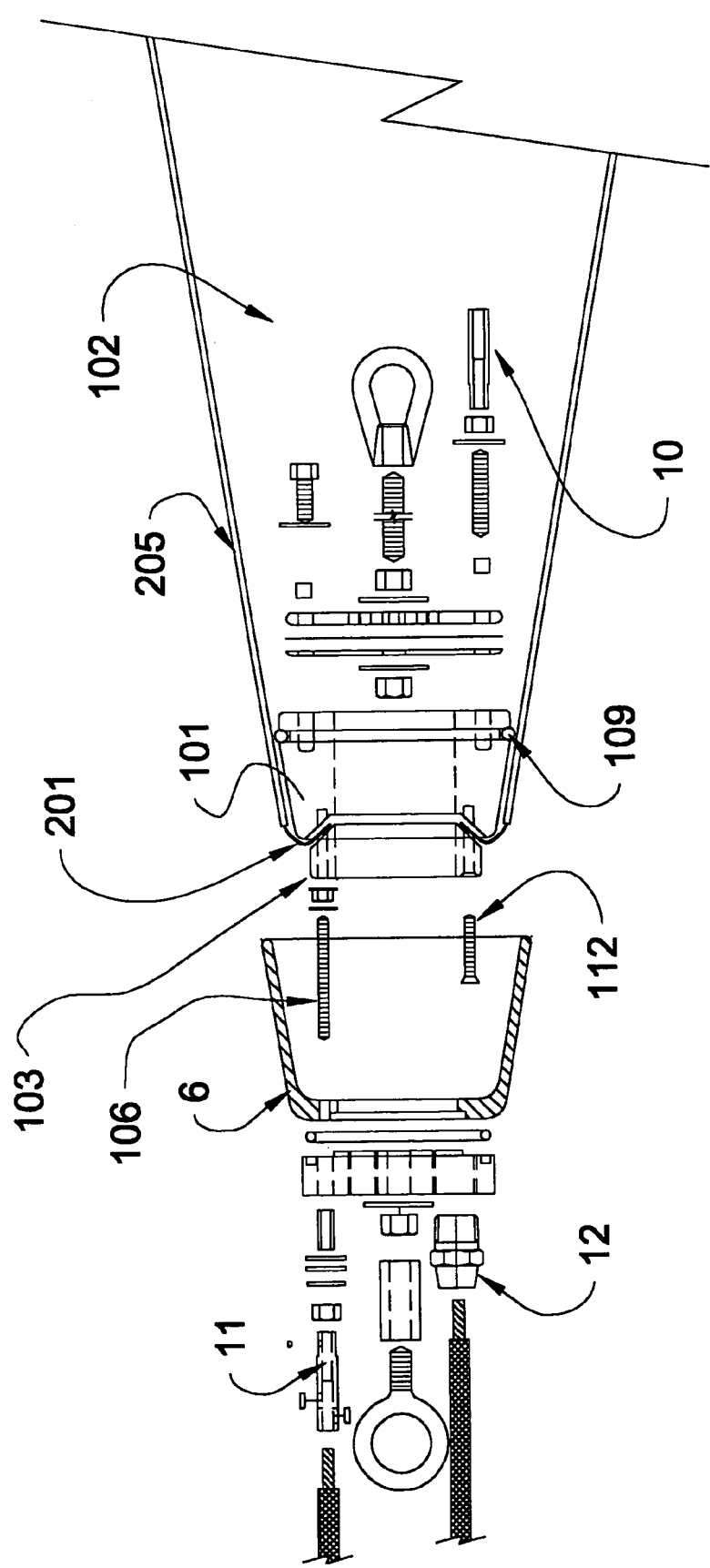
FIG. 9 is an exploded cross-sectional view of a end portion of the inflatable heating device of the present invention; and, FIG. 10 is a side view of the end portion shown in FIG. 9.
Figure 10:
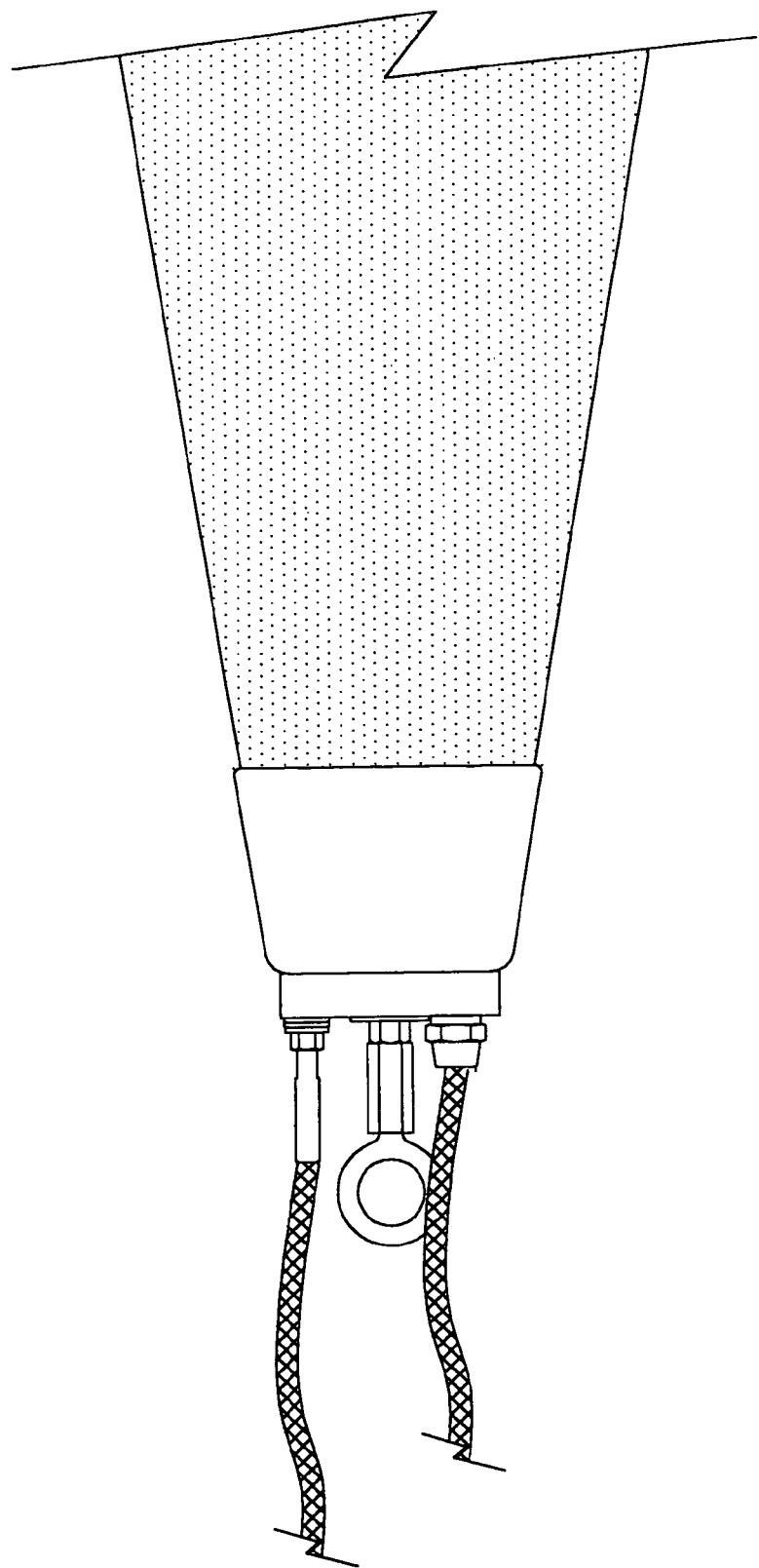

FIGS. 3–5 show the elastomeric composite 205 integrated into a heater/inflation module 210. The module 210 includes front and rear end pieces 6,8 to effectively seal the interior of the composite 205. Thus, the front and rear end pieces 6,8 are permanently attached to the front and rear ends of the composite 205 and sealed by sealing means 112, 101. The front end piece 6 includes an air line 7, a vacuum line 10, and one or more electrical cable lines (not shown) within an electrical conduit 11. These lines 7,10,11 respectively provide communication to an air compressor, vacuum supply source and electrical energy source (not shown) used in the in-situ repair method described below.

In the embodiment shown in FIGS. 4 and 5, the front end piece 6 (as well as the rear end piece 8) includes a metallic contacting band 103 and a sealing mechanism sealing bands 101. The bands 101,103 may be constructed of type 201 stainless steel having ½ inch width. As shown in FIG. 5, the bands 101,103 may be secured to the composite 205 by conventional means such as type 301 stainless steel set screw buckles 112. The end pieces 6,8 are constructed from cast or machined aluminum or a fiber-reinforced, high-temperature plastic material. The end pieces 6,8 also have at least one circumferential groove 113 serving as a mechanical attachment point between the composite 205 and the end pieces 6,8 and to increase the sealing surface area. The metallic bands 103 ensure electrical continuity and the transfer of electrical energy to the conductive heating core 201 of the composite 205. As preferably shown in FIG. 4, an electrical input line within electrical conduit 11 leads through the front end piece 6 to the conductive metallic band 103 and is connected thereto by an internal terminal 106. An electrical output line 12 enters through the front end piece 6, runs longitudinally through the inflation chamber 102, and contacts the heating element layer 201 at the rear end piece 8 to complete the resistive heating circuit. This arrangement effectively creates a circuit for electrical energy to pass through the entire composite 205 while only requiring external electrical connections at one end piece.

A pre-preg 3 is removably attached to the outer surface of the composite 205 by conventional means, such as rubber bands, sewing, or adhesive. The pre-preg 3 is generally defined as a fibrous fabric reinforcement impregnated with a liquid, heat curable resin. The resin may be an epoxy, a cyanate ester, polyester, a vinyl ester, a polyurethane, or a blend of these and other materials having similar characteristics. One type of pre-preg found suitable is prepared from a glass fiber matrix saturated with an isopolyester resin base catalyzed with 1% by weight perkadox 16 organic peroxide percarbonate, available from Akzo Chemicals, and with 1% by weight trigonox 29-B75 organic peroxide, also available from Akzo Chemicals. This catalyzed material constitutes an A-staged pre-preg having a shelf-life of 7–9 days. For the present application, it is preferable that the resin be capable of exotherming in the range of 180 of to 400 of. The term "exotherm" refers to the temperature to which the resin will rise upon initiation of chemical cross-linking during the curing process.

It has also been found beneficial to chemically thicken the pre-preg resin to a gelled state by adding a urethane additive such as Reichhold RD 1070 to the resin before the resin has been applied to the structural fiber matrix of the pre-preg. This thickening process converts the liquid resin into an immobile, non-migratory state, ensures that the resin matrix will not be affected by diverse environmental variables such as moisture, ensures a consistent liner thickness, and increases shelf life.

In operation, the heater/inflation module 210 with the attached pre-preg 3 is transported to the damaged section 2 of the pipe 1. Transportation may be accomplished by using winches (not shown) or other known equipment. For instance, FIG. 3 shows a front winch cable 9 attached to a front winch pull 105 on the front end piece 6, and a rear winch cable 5 is likewise attached to the rear end piece 8. The winch cables 5,9 run to the ground surface via supply chutes and manholes (not shown). Invert rollers (not shown) may be used to facilitate movement of the cables 5,9.

Once the module 210 is in place, an air compressor (not shown) is engaged to direct air into the interior or inflation chamber 102 of the module 210 through its air line 7. The module 210 is brought to a predetermined pressure to expand the composite 205 within the pipe 1. Consequently, the pre-preg 3 is forced against the interior surface of the pipe section 2 and thus conforms to the internal shape of the pipe 1. Electrical current is then flowed from a remote power source (not shown) through the one or more electrical cables 11 to resistively heat the module 210. As noted earlier, the temperature profile exhibited by the module 210 will depend upon the location and density of the conductive fiber braids 201 of the composite 205. The heat given off by the module 210 is maintained to permit the pre-preg resin to exotherm and thus activate the curing phase. Once the pre-preg 3 has fully cured against the damaged pipe section 2, the module 210 is deflated by engaging a remote vacuum source (not shown) to draw a vacuum through the vacuum line 10. The module 210 may then by removed from the repaired pipe 1.

It will be understood that a closed-loop programmable logic controller may be employed to monitor and vary both the internal air pressure and the temperature profile of the module during the repair operation. The controller or similar means may thus assist in achieving a uniform cure despite varying conditions.

The materials used to construct the inflatable heating device or module 210 can be critical with respect to the final operation of the module in certain instances. That is, the intended use and the environmental conditions need to be considered in the material selection. For example, if the module 210 is to be employed in a pipe repair procedure wherein the module is required to carry a pre-preg 3 to a designated area of repair, to inflate to a pre-determined diameter, apply a specific force to the repair material, and to provide a uniform temperature profile across the entire surface of the pre-preg 3, the materials selected to construct the module 210 must be suitable for all of these operations.

Another embodiment of an inflatable heating device or module 210 of the present invention is disclosed in FIGS. 6–10.

In the present invention, multiple compositions can be considered and formed into the module using the resistive heat generating capability of carbon fibers in the module itself. A rotating mandrel can be provided as the forming surface of the composite 205. If the module is to be used for a pipe repair procedure, the mandrel would be generally cylindrical in shape and have a diameter closely approximating the inside diameter of the pipe to be repaired (minus the thickness of the module materials and allowing for 10–15% expansion of the module). A fluorosilicone material is utilized as an internal surface due to its inherent impermeability and low vapor transmission properties. The heating grid of the module is preferably a non-ferrous material, and is more preferably constructed of carbon fibers. Carbon fibers, with their exceptional tensile strength, electrical conductivity and chemical inertness, are used as both the heat producing element and the reinforcement for the module 210. The heating element can include a plurality of wound fibers comprising of temperature tolerant fiber windings and electrically conductive, i.e., carbon fiber, windings. An outer layer of a fluorocarbon could also be used to protect and contain the carbon fibers as well as providing a highly resistant (both chemically and thermally) and resilient outer skin. Because of the fluoropolymer similarities, during the consolidation and forming on the mandrel, the uncured flourosilicone and fluorocarbon materials are co-cured and bonded together to form a homogenous mass capable of resisting chemicals, abrasion and heat while maintaining flexibility.

The carbon fibers, when wound in a generally circumferential fashion around the mandrel in a helix formation, can be placed at an angle relative to the longitudinal axis of the mandrel (and thus to the completed module). This angle can be pre-selected and controlled during the production of the module in order to limit the amount of expansion of the completed module 210, while providing the necessary support to the fluorosilicone/fluorocarbon matrix. Winding the carbon fibers in a helix allows for circumferential expansion and provides electrical continuity from one end to an opposing end of the module 210. By orienting the carbon fibers at an angle of +/−45° in relation to the longitudinal axis of the module 210, a degree of expansion can be assumed without undue stress on the fibers. As pressure is applied to the internal portion of the module 210 (in operation), as with air pressure, the module 210 can expand radially as the fiber angle changes from the 45° up to an angle approaching 56°, where the fibers essentially lock and restrict any further expansion effectively rigidizing the structure. Carbon fibers are traditionally chosen for various products due to their strength and therefore eliminate the need for additional reinforcement. Because of the high strength of carbon fiber, this action (i.e., expansion) can be performed repeatedly with minimal effect on the module 210, thus ensuring an exceptional life cycle.

With appropriate electrical contacts to communicate an electric current to the carbon fibers disposed within the module 210, the carbon fibers can be used as heating elements capable of generating temperatures in excess of 500 of without fear of degradation. During the fabrication of the module 210, the carbon fibers are introduced to the uncured fluoropolymers in a fibrous state. The uncured materials, being soft and with a very low durometer in this state, readily accept the carbon fibers, effectively encapsulating and bonding the fibers to the matrix.

According to another aspect of the invention, the carbon fibers used as the reinforcement and a means for generating heat in the finished module 210, can be used provide heat to cure the components of the module itself during its manufacture. With the desired lay-up of materials for the module complete, conventional methods are used to consolidate the materials prior to curing, such as wrapping with release tape or web under pressure, enveloping the entire assembly with a membrane or film and drawing vacuum, or applying a layer of film, that when heated, will shrink and provide compaction.

Traditionally, the entire mandrel and composition of the inflatable heater would then be relocated to a curing oven. In the present invention, the carbon fibers are captured at each end and an electric current is introduced. Carbon fibers, being low in mass and with a known conductivity, will rapidly produce heat in a uniform manner. Because the electrical properties of carbon can be readily assumed, precise and uniform heating can be achieved. Also, because the heat source is within the composition of the module, cycle times can be dramatically reduced and excess heat generation is minimized. Energy consumption is far less than traditional methods. This can all be accomplished with the use of an inexpensive power supply as compared to costly ovens. Because the cure cycle is markedly faster than with an oven or the like, heat transfer to the mandrel is reduced therefor providing quicker cool-down an subsequent part removal.

While the specific embodiment has been illustrated and described, numerous modifications come to mind without significantly departing from the spirit of the invention, and the scope of protection is only limited by the scope of the accompanying claims.

We claim:

1. An apparatus for curing a pre-preg repair material supporting a heat curable resin for in-situ repair of a conduit, comprising:
    an elastomeric composite having a first end and a second end, wherein the composite includes a non-ferrous heating element comprising electrically conductive fibers comprised of carbon fibers, graphite fibers, carbon filaments or graphite filaments and disposed within a thermoset resin matrix wherein the electrically conductive fibers are braided or arranged helically;
    a first end piece fixedly attached to the first end of the composite and having an air port for communication with a compressed air source, a vacuum port for communication with a vacuum supply source and at least one electrical cable port to convey electric current to the non-ferrous heating element from a power supply source; and
    a second end piece fixedly attached to the second end of the composite, wherein the composite, the first end piece, and the second end piece form a generally hollow inflation chamber.

2. The apparatus of claim 1 wherein the thermoset resin is selected from the group consisting of fluorocarbon and fluorosilicone.

3. The apparatus of claim 1 wherein the heating element includes a plurality of braided fibers comprising temperature tolerant fiber braids and electrically conductive fiber braids.

4. The apparatus of claim 3 wherein the braided fibers interact to define a braid angle measure at +/−45 degrees.

5. The apparatus of claim 3 wherein the electrically conductive fiber braids are carbon filaments.

6. An apparatus for curing a pre-preg repair material supporting a heat curable resin for in-situ repair of a conduit, comprising:
    an elastomeric composite having a first end and a second end, wherein the composite includes a non-ferrous heating element comprised of a plurality of filament wound carbon fibers, filament wound graphite fibers, filament wound carbon filaments or filament wound graphite filaments and disposed within a thermoset resin matrix;
    a first end piece fixedly attached to the first end of the composite and having an air port for communication with a compressed air source, a vacuum port for communication with a vacuum supply source and at least one electrical cable port to convey electric current to the non-ferrous heating element from a power supply source; and
    a second end piece fixedly attached to the second end of the composite, wherein the composite, the first end piece, and the second end piece form a generally hollow inflation chamber.

7. The apparatus of claim 6 wherein the wound fibers interact to define an angle measure at +/−45 degrees.

8. A method for repairing a damaged section of a conduit comprising the steps of:
    providing an elastomeric composite having a first and second end, wherein the composite includes a non-ferrous electrically conductive heating element comprising electrically conductive fibers comprising carbon fibers, graphite fibers, carbon filaments or graphite filaments and disposed within a thermoset resin matrix wherein the electrically conductive fibers are braided or arranged helically;
    fixedly attaching a first and second end piece respectively to the first and second ends of the composite, wherein the first end piece, the second end piece, and the composite form a heating/inflation module;
    removably attaching a pre-preg to an outer surface of the composite, wherein the pre-preg includes a structural fiber matrix supporting a heat curable resin;
    positioning the module with the attached pre-preg into the conduit at a damaged location;
    inflating the module to a predetermined internal air pressure to expand the composite and press the pre-preg against an inside surface of the conduit;
    curing the resin of the pre-preg by causing an electrical current to flow in the heating element to resistively heat the module to a predetermined temperature; and
    deflating the module and removing it from the conduit.

9. A system for in-situ repair of a conduit, comprising:
    an apparatus including an elastomeric composite having a first end and a second end, wherein the composite includes a non-ferrous heating element comprising electrically conductive fibers comprising carbon fibers, graphite fibers, carbon filaments or graphite filaments and disposed within a thermoset resin matrix wherein the electrically conductive fibers are braided or arranged helically;
    a first end piece fixedly attached to the first end of the composite and having an air port for communication with a compressed air source, a vacuum port for communication with a vacuum supply source and at least one electrical cable port to convey electric current to the non-ferrous heating element from a power supply source;
    a second end piece fixedly attached to the second end of the composite, wherein the composite, the first end piece, and the second end piece form an inflation chamber; and,
    a pre-preg removably attached to an outer surface of the composite of the apparatus, the pre-preg including a structural fiber matrix supporting a heat curable resin.

* * * * *